Patented Apr. 25, 1944

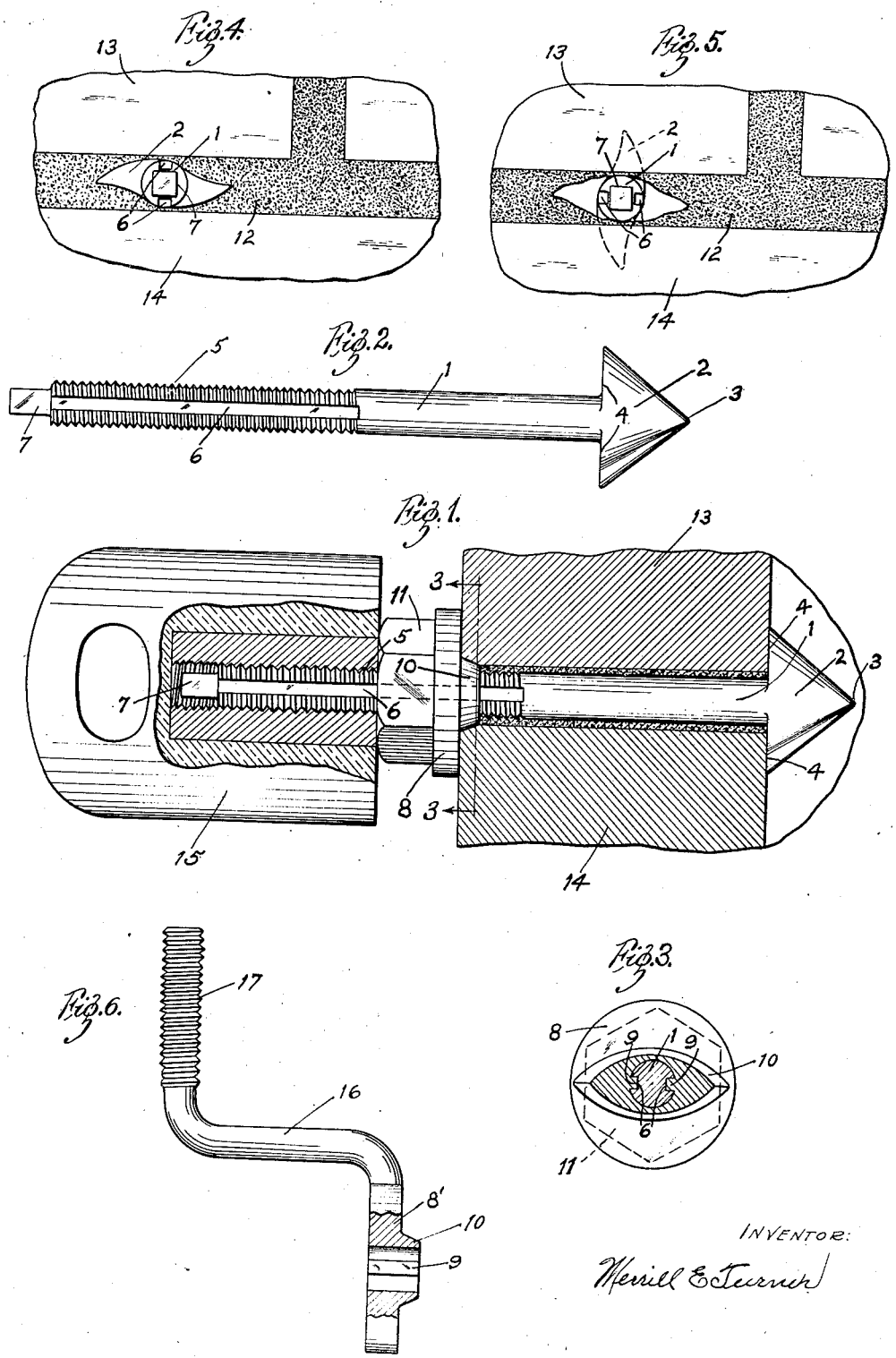

2,347,581

UNITED STATES PATENT OFFICE 2,347,581

ANCHOR BOLT

Merrill E. Turner, University City, Mo.

Application February 3, 1941, Serial No. 377,187

3 Claims. (Cl. 72—101)

This invention relates to anchoring means and more particularly an anchor bolt that can be quickly attached to a support such as a wall.

One of the objects of my invention is to provide an improved anchor bolt which can be readily attached to a support and once attached will remain so until detached by proper manipulation of the parts.

Another object of my invention is to provide means for association with an anchor bolt for preventing it from being turned in such a way that it can be pulled from its support.

Still another object of my invention is to so construct an anchor bolt that when attached to a support, all openings where it enters said support will be sealed against entry of moisture, dust, dirt, and undesirable substances.

Other objects of my invention will become apparent from the following description taken in connection with the accompanying drawing in which Figure 1 is a view of my improved anchor bolt and parts showing them attached to a brick wall; Figure 2 is side view of the bolt; Figure 3 is a view of the locking washer taken on the line 3—3 of Figure 1; Figures 4 and 5 are views of a part of a brick wall showing the position of the bolt prior to its being driven into the wall between two bricks and after said bolt has been turned to its operative position; and Figure 6 is a view of a modified form of locking washer having attaching means thereon.

Referring to Figures 1 to 5 inclusive, 1 indicates the body of the bolt which has formed on its forward end an arrow shaped head 2 providing a piercing point 3 and shoulders 4. The body portion of the bolt from its rear end forward is provided with threads 5 and also with diametrically positioned axially extending grooves 6. The extreme rear end has flat surfaces 7 in order to receive a tool for turning the bolt.

A locking washer 8 cooperates with the body of the bolt and is provided with diametrically positioned projections 9 at its central opening for cooperation with the grooves 6 in the bolt to thereby prevent any relative turning between the washer and body of the bolt. On surface of the washer which is to be presented toward the head end of the bolt there is provided a projection 10 tapering outwardly from the surface of the washer. The base of the particular projection shown is somewhat diamond shaped with a major axis so related to the projections 9 on the washer when said washer is positioned on the bolt that said major axis will be at right angles to the shoulders 4 on the head. The length of this major axis is preferably slightly greater than the width of the head at the shoulders. The minor axis of the diamond shaped base of projection 10 is only of slightly greater length than the diameter of the hole in the washer. In addition to the locking washer, the bolt is provided with a nut 11 cooperating with the threads.

To attach the anchor bolt, as for example to a brick wall, the head 2 is placed against the mortar joint 12, between two bricks, 13 and 14, with the plane of the arrow-shaped head parallel with the joint. This position is shown in Figure 4. The bolt is now driven into the joint by hitting the rear end thereof. When the head projects beyond the other side of the bricks a tool is employed in cooperation with the flat end surfaces 7 and the bolt rotated 90 degrees to a position shown in Figure 5. This now places the shoulders 4 of the head in a position to engage the bricks 13 and 14 so that the bolt cannot be pulled back out through the mortar joint. The final position of the bolt in relation to the bricks is also shown in Figure 1. The locking washer 8 is now positioned on the bolt, if not already thereon, and then the nut 11 screwed up. This draws the shoulders 4 against the bricks and forces the projection 10 on the washer into the opening (see Figure 5) caused by the driving of the head into the mortar joint. As the nut is screwed up to where the surface of the washer engages the outer surface of the bricks the opening will be completely filled and no moisture, dirt, etc., will be able to enter any opening along side of the bolt. Also when the projection 10 has been forced into the opening created by the driving of the head through the mortar joint, this projection will prevent the bolt from being turned from its operative position as there can be no relative rotative movement between the washer and bolt. Therefore, even if the bolt should become somewhat loose it cannot be so turned as to permit the head to be pulled out of the wall. If just a common flat washer were used, this could easily happen.

The portion of the threaded body of the bolt extending beyond the wall may receive a suitable member 15 whereby anything desired can be attached to the bolt and thus to the wall. The member 15 shown is a porcelain knob permitting the fastening of an electrical conductor. The knob is screwed directly onto the bolt. It is obvious of course that with this type of knob, the nut may be dispensed with and its function transferred to the knob.

In Figure 6 there is shown a modified form of locking washer 8. The body of the washer is the same as previously described being provided with the projection 10. In addition however, there is formed integral with the washer an arm 16 which is so related to the washer that it will be positioned away from the wall when the bolt is attached to said wall and in place. This arm serves as a means for attaching any member to the bolt and by means of the bolt to the wall. As shown the arm is provided with threads 17 but it is obvious it can be provided with a hook, eye or any other attaching means.

Although I have shown my improved anchor bolt so constructed as to be attachable to a brick wall it may be easily altered so as to be attachable to other types of walls or supports in which the hole is either formed by the bolt being driven in the wall or is preformed. The bolt can also be used to fasten two members together.

Being aware of the possibility of modifications in the particular structure herein described without departing from the fundamental principles of my invention, I do not intend that its scope be limited except as set forth by the appended claims.

What I claim as new and desire to secure by Letters Patent of the United States is:

1. An anchor bolt construction for attachment to a support, said construction comprising a bolt body provided with a head having a shoulder facing the body of the bolt so as to engage the rear surface of the support after the head has been passed through the support and the bolt turned through an angle, a washer adapted to be mounted on the bolt, cooperating means carried by the washer and bolt for preventing relative rotation, said washer being provided with a projecting portion extending from one side of the washer in surrounding relation to the washer opening and tapered from the washer toward the washer axis so that when the bolt is in position in the support and the washer mounted on the outer end with the projection toward the support said projection can be forced into the support opening to thus fill the entire end of the opening in the support after the head has been passed through the support, and means cooperating with the bolt body and the washer for forcing the projection into tight wedging relation with the surface forming the outer end portion of the opening in the support and also holding the shoulder of the head against the support.

2. An anchor bolt construction for attachment to a support, said construction comprising a bolt body having a threaded portion adjacent one end and a relatively flat piercing head at the other end to facilitate driving of the bolt through the support, said head also being formed to provide diametrically opposed shoulders facing the body of the bolt so as to engage the rear surface of the support after the head passes through the support and the bolt has been turned through an angle, a washer adapted to be mounted on the bolt, cooperating means carried by the washer and bolt for preventing relative rotation, said washer being provided with a wedge-shaped projection with its surfaces extending from one side of the washer toward the washer axis and in total surrounding relation to the washer opening so that when the bolt is in position in the support and the washer mounted on the outer end with the projection toward the support said projection can extend into the support opening formed by the driving of the head through the support to thus completely fill the end of the opening on all sides of the bolt body, and a nut on the threaded portion of the bolt for forcing the projection into tight wedging relation with the outer end portion of the opening in the support on all sides of the bolt.

3. An anchor bolt construction for attachment to a support, said construction comprising a bolt body having a threaded portion adjacent one end and a relatively flat piercing head at the other end to facilitate driving of the bolt through the support, said head also being formed to provide diametrically opposed shoulders facing the body of the bolt so as to engage the rear surface of the support after the head passes through the support and the bolt has been turned through an angle, a washer adapted to be mounted on the bolt, cooperating means carried by the washer and bolt for preventing relative rotation, said washer being provided with a projecting portion tapered toward its outer end and extending from one side of the washer in surrounding relation to the washer opening so that when the bolt is in position in the support and the washer mounted on the outer end with the projection toward the support said projection can be forced into the end of the support opening formed by the driving of the head through the support, said washer also being provided with an integral arm extending away from the plane of the washer and having a threaded end for attachment of a threaded member, and a nut on the threaded portion of the bolt for forcing the projection into tight wedging relation with the said end portion of the opening in the support.

MERRILL E. TURNER.